(12) United States Patent
Rizzi et al.

(10) Patent No.: US 11,966,773 B2
(45) Date of Patent: Apr. 23, 2024

(54) AUTOMATED PIPELINE FOR GENERATING RULES FOR A MIGRATION ENGINE

(71) Applicant: Red Hat, Inc., Raleigh, NC (US)

(72) Inventors: Marco Rizzi, Vicenza (IT); Paolo Antinori, Novara (IT)

(73) Assignee: RED HAT, INC., Raleigh, NC (US)

( * ) Notice: Subject to any disclaimer, the term of this patent is extended or adjusted under 35 U.S.C. 154(b) by 611 days.

(21) Appl. No.: 17/171,228

(22) Filed: Feb. 9, 2021

(65) Prior Publication Data
US 2022/0253333 A1    Aug. 11, 2022

(51) Int. Cl.
*G06F 9/48*    (2006.01)
*G06F 9/46*    (2006.01)
*G06F 9/54*    (2006.01)
*G06F 11/36*   (2006.01)

(52) U.S. Cl.
CPC ............ *G06F 9/4875* (2013.01); *G06F 9/461* (2013.01); *G06F 9/542* (2013.01); *G06F 11/3688* (2013.01); *G06F 11/3692* (2013.01); *G06F 11/3696* (2013.01)

(58) Field of Classification Search
CPC .................................................. G06F 9/4875
See application file for complete search history.

(56) References Cited

U.S. PATENT DOCUMENTS

| 10,311,030 B1 | 6/2019 | Barnes et al. |
| 10,613,849 B2 | 4/2020 | Pirzadeh et al. |
| 11,514,132 B2 * | 11/2022 | Hermann ............... G06F 16/214 |
| 2007/0299975 A1 | 12/2007 | Daschakowsky et al. |
| 2012/0054731 A1 | 3/2012 | Aravamudan et al. |

FOREIGN PATENT DOCUMENTS

CN    102196049 B    6/2013

OTHER PUBLICATIONS

Alrubaye, H., et al., "Migration Miner: An Automated Detection Tool of Third-Party Java Library Migration at the Method Level," IEEE International Conference on Software Maintenance and Evolution, 2019, https://ieeexplore.ieee.org/document/8919240.

(Continued)

*Primary Examiner* — Charlie Sun
(74) *Attorney, Agent, or Firm* — Kilpatrick Townsend & Stockton LLP

(57) ABSTRACT

Migration rules for a migration engine can be automatically generated using an automated pipeline. In one example, a system can receive first information indicating first characteristics of first software and can receive second information indicating second characteristics of second software. The system can determine a difference between the first characteristics and the second characteristics. The system can then generate a rule for a migration engine based on the difference, the rule including a conditional statement configured for use by the migration engine to detect the difference in relation to a migration process for migrating the first software to the second software. The system can provide the rule for use by the migration engine, to enable the migration engine to detect the difference and responsively generate a notification associated with the difference.

18 Claims, 3 Drawing Sheets

(56) References Cited

OTHER PUBLICATIONS

Chadhaa, S., et al., "Facilitating the Development of Cross-Platform Software via Automated Code Synthesis from Web-Based Programming Resources," Software Innovations Lab Virginia Tech, 2016, https://www.sciencedirect.com/science/article/abs/pii/S1477842415300634.
Wang, H., et al., "Semi-Automated Model Matching Using Version Difference," Advanced Engineering Informatics, 2008, https://www.sciencedirect.com/science/article/abs/pii/S1474034608000360.

\* cited by examiner

AUTOMATED PIPELINE FOR GENERATING RULES FOR A MIGRATION ENGINE

TECHNICAL FIELD

The present disclosure relates generally to migrating software. More specifically, but not by way of limitation, this disclosure relates to an automated pipeline for generating rules for a migration engine.

BACKGROUND

It has become commonplace for developers to continue to develop and provide updates for (e.g., new versions of) software over time. For example, developers may provide updates over time that add features to the software or remove existing features from the software. New software may also be created that has similar functionality to older software. A user may wish to replace the existing software in a computing environment with such updates or new software. This process of switching from a first piece of software to a second piece of software in a computing environment is often referred to as migration. In some cases, migration can involve switching from a first piece of software to a second piece of software, where the first piece of software and the second piece of software are different versions of the same piece of software. For example, the first piece of software may be an older version (e.g., version 1.0) of a webserver and the second piece of software may be a newer version (e.g., version 1.2) of the webserver. In other cases, migration can involve switching from a first piece of software to a second piece of software, where the first piece of software and the second piece of software can be entirely different software with the same or similar functionality. For example, the first piece of software may be Kubernetes and the second piece of software may be OpenShift, both of which are container-orchestration platforms.

Since migration can be complex, a migration engine is often used to simplify and automate the migration process. A migration engine is software configured to effectuate the migration from a first piece of software to a second piece of software. One example of a migration engine can be the Migration Toolkit for Applications (MTA) by Red Hat®.

Some migrations engines can rely on a set of rules to analyze or implement a target migration process. The rules can be configured for detecting certain conditions associated with the target migration process and flagging them for the user. This may assist the user in identifying problems with the target migration process, either preemptively before the migration process has begun or after the migration process has begun.

DETAILED DESCRIPTION

Figure 1:
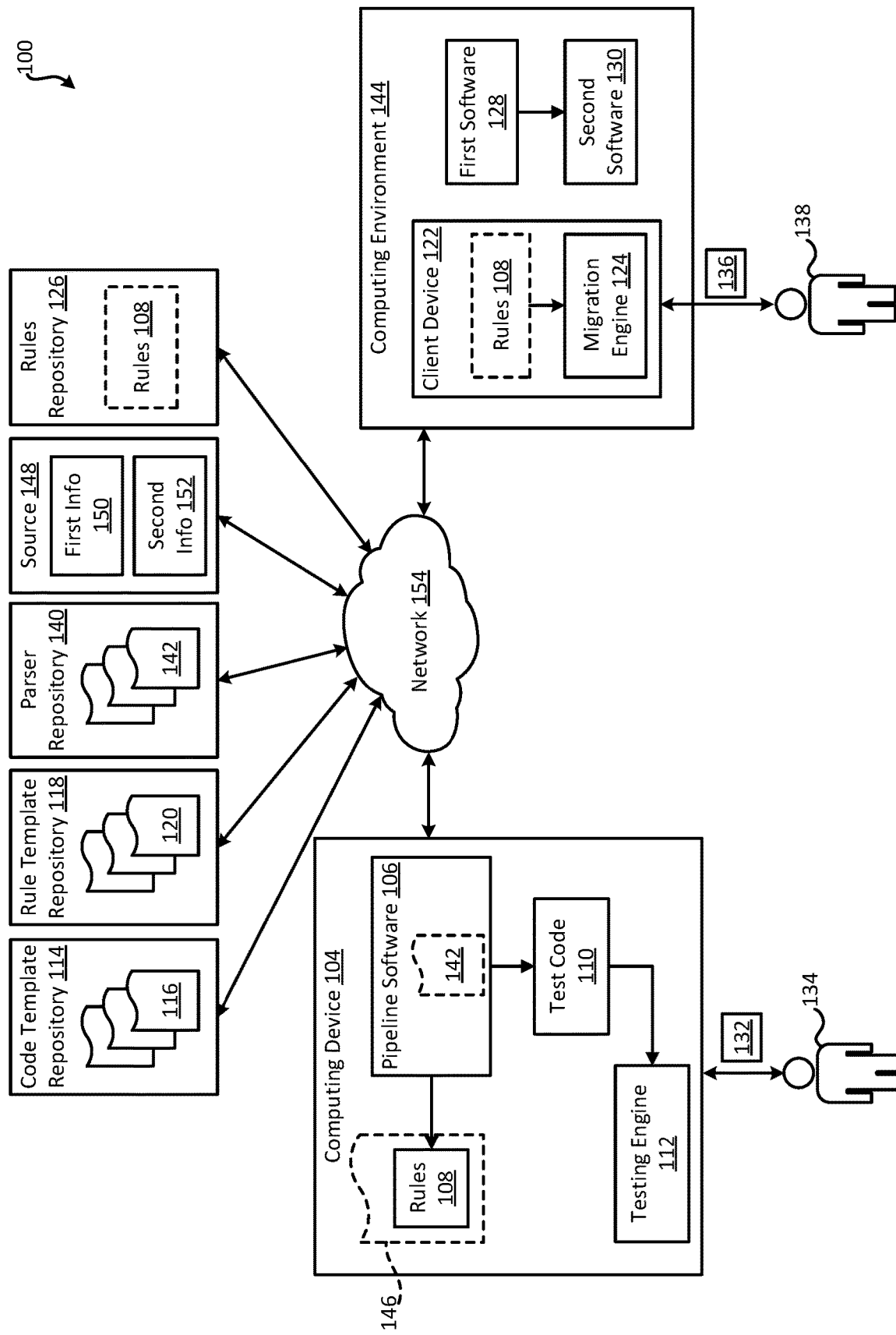
FIG. 1 is a block diagram of an example of a system for generating migration rules for a migration engine according to some aspects of the present disclosure.

Migration engines are often used to migrate a first piece of software to a second piece of software in a computing environment. Such migration engines may use rules to analyze the migration process, either before or after the migration process has begun, to flag potential problems with the migration process. Conventionally, the rules are manually drafted by developers of the migration engine. This can be a complex- and slow-process that does not scale well. There are such a large number of possible migration scenarios that it is challenging for developers to manually draft rules for most, much less all, scenarios. As a result, rules simply do not exist for many migration scenarios, either because developers have not gotten to them yet or because the migration scenarios have been intentionally or accidentally skipped. Without such rules, the migration engine is unable to flag problematic migration scenarios that can lead to migration failures and other significant computing problems.

The manual drafting process is also subjective and can require expertise with the migrated software, which can result in drafting errors. And if the rules are not properly drafted, several problems may arise. For example, the migration engine may improperly flag an advantageous migration scenario as being problematic, which may result in the user forgoing a migration that would otherwise improve functionality, security, or consumption of computing resources. This improper flagging of an advantageous migration scenario may be referred to as over-flagging. Alternatively, the migration engine may not flag a problematic migration scenario, which may result in the user implementing a migration that worsens functionality, security, or consumption of computing resources. This failure to flag a problematic migration scenario can be referred to as under-flagging. As one particular example, the migration engine may fail to flag a problematic migration due to an improperly drafted rule, where the problematic migration involves migrating from old software to new software that is incompatible with an application or file in the computing environment. As a result, the new software may fail to properly execute in the computing environment after the migration process completes.

Some examples of the present disclosure can overcome one or more of the abovementioned problems by providing an automated pipeline for generating rules for a migration engine that can assist in migrating first software to second software in a computing environment. The automated pipeline can involve receiving first information describing first characteristics of first software and receiving second information describing second characteristics of second software. Examples of the first information and the second information can include source code, configuration files, specifications, supporting documentation, metadata, or database tables. The automated pipeline can compare the first characteristics to the second characteristics to determine one or more differences between the two. The automated pipeline can then automatically generate one or more rules for a migration engine based on the one or more differences. The rules can include conditional statements that are usable by the migration engine to detect the one or more differences. After generating the rules, the automated pipeline can provide the rules for use by the migration engine. For example, the automated pipeline can store the rules in one or more data structures (e.g., files, objects, or databases) that are configured to be ingested and used by the migration engine. By automatically generating the rules in this way, better rules can be generated for a wider variety of migration scenarios at a faster pace than may otherwise be possible. This can improve software migration by reducing over-flagging and under-flagging, for example due to lack of appropriate rules or deficiencies with existing rules. The automated pipeline can also reduce the burden on developers associated with manually drafting the rules.

After the rules are generated, the rules can be stored in a location that is accessible to one or more client devices. For example, the data structures containing the rules can be uploaded to a repository that is accessible to the client devices. A client device can then obtain the rules and integrate them with a migration engine. For example, the client device can download the rules and provide the rules to the migration engine installed on the client device. The migration engine can then use the rules to analyze a migration process involving migrating the first software to the second software in a computing environment, to detect the presence of the one or more differences. If the differences exist, the migration engine can flag the differences for a user, so that the user can take appropriate action. Examples of such appropriate action can include foregoing the migration altogether or resolving the differences before continuing with the migration. In this way, the migration engine can use the automatically generated rules to improve the migration process by flagging potential problems for the user, so that the problems can be timely remedied before they escalate.

In some cases, developers may wish to test the rules to ensure they operate properly. Testing a rule can involve validating that the rule yields one or more desired outputs in response to one or more test conditions. Conventionally, developers would test a rule by manually drafting test code for the rule. The test code can include program code that is executable by a testing engine to test a target rule. But manually drafting test code can also be a complex, subjective, tedious, slow, and error-prone process that does not scale well, for similar reasons as discussed above.

In some examples, the automated pipeline can overcome one or more of the abovementioned problems by automatically generating test code for use in testing a target rule, such as a rule that was automatically generated by the pipeline. The automated pipeline may generate the test code using any suitable approach. For example, the automated pipeline can select a predefined code template from among a group of predefined code templates based on one or more properties of the target rule. The automated pipeline can then adjust one or more variable values in the predefined code template to create the test code for the target rule. Of course, other approaches to generating the test code are also possible. By automatically generating and executing the test code, the rules to be quality tested to ensure they operate as desired. Rules that fail to operate properly can be identified (e.g., for a user), so that they can be fixed or removed. This can further improve software migration by ensuring that the rules relied upon by a migration engine are of high quality, to avoid under-flagging and over-flagging. This may also reduce the burden on developers associated with manually drafting the test code.

As one specific example, the automated pipeline can be applied in relation to migrating from version 2.15.1 of the "camel-core" library to version 3.7.0. In this example, the automated pipeline can involve receiving the first source code for version 2.15.1 of the camel-core library. The automated pipeline can also involve receiving second source code for version 3.7.0 of this library. The first source code can then be compared to the second source code, to determine one or more differences between the two. Based on the one or more differences, the automated pipeline can generate one or more rules. The rules may be usable by a migration engine to, for example, detect and report older methods (in some of the Java classes) that were present in the older version 2.15.1 but that are no longer present in the newer version 3.7.0, since such differences may be problematic with respect to the migration.

As another specific example, the automated pipeline can be applied in relation to migrating from version 1 of a Standard Query Language (SQL) database schema to version 2. In this example, the automated pipeline can involve receiving first set of SQL (e.g., PLSQL) source files for version 1 of the database schema. The automated pipeline can also involve receiving a second set of SQL files for version 2 of the database schema. The first set of SQL files for can then be compared to the second set of SQL files for, to determine one or more differences between the two. Based on the one or more differences, the automated pipeline can generate one or more rules. The rules may be usable by a migration engine to, for example, detect and report eventual occurrences of incompatible data types (e.g., if a column's definition has changed) or the removal of columns (e.g., if the table's definitions have changed), since such differences may be problematic with respect to the migration.

As yet another specific example, the automated pipeline can be applied in relation to migrating from version 4 of Red Hat Enterprise Linux (RHEL) to version 7. In this example, the automated pipeline can involve receiving first metadata defined in a .rpm package associated with version 4 of RHEL. The automated pipeline can also involve receiving second metadata defined in a .rpm package associated with version 7 of RHEL. The first metadata can then be compared to the second metadata, to determine one or more differences between the two. Based on the one or more differences, the automated pipeline can generate one or more rules. The rules may be usable by a migration engine to, for example, detect and report if the declared dependencies available in version 4 of RHEL are also available in version 7, since the unavailability of such dependencies may be problematic with respect to the migration.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 according to some aspects of the present disclosure. The system 100 includes a computing device 104. Examples of the computing device 104 can include a server, desktop computer, laptop computer, tablet, e-reader, or mobile phone. The computing device 104 can include pipeline software 106 configured to execute an automated pipeline for automatically generating rules 108 for a migration engine 124.

More specifically, the pipeline software 106 can receive user input from a user 134 (e.g., a developer) indicating first software 128 that is to be migrated to second software 130 using a migration engine, such as migration engine 124. Examples of the first software 128 and the second software 130 can include libraries, software projects, software applications, etc. Based on the user input, the pipeline software 106 can execute the automated pipeline to generate the rules 108. In particular, the pipeline software 106 can begin by obtaining first information 150 associated with the first software 128 and second information 152 associated with the second software 130. The pipeline software 106 can obtain the first information 150 and the second information 152 from one or more sources 148. Examples of the sources 148 can include project repositories, such as GitHub repositories; webpages for the software; etc.

The first information 150 and the second information 152 can be any suitable information indicating one or more characteristics of the first software 128 and the second software 130, respectively. Examples of the first information 150 and the second information 152 can include source code, configuration files, specifications, supporting documentation (e.g., readme and installation files), metadata, database table definitions, or any combination of these. As one specific example, the first information 150 can include a list of binary files that are present in the first software 128, and the second information 152 can include a list of binary files that are present in the second software 130. As another example, the first information 150 can be a configuration file describing settings of the first software 128 and the second information 152 can be a configuration file describing settings of the second software 130. As yet another example, the first information 150 can be source code for the first software 128 and the second information 152 can be source code for the second software 130.

In some examples, the first information 150 and the second information 152 may be of the same type and/or may have the same format. For example, the first information 150 and the second information 152 may both be in a JavaScript Object Notation (JSON) format, a YAML Ain't Markup Language (YAML) format, an OpenAPI format, an AsyncAPI format, or a Web Services Description Language (WSDL) format. As another example, the first information 150 and the second information 152 may both be drafted using the same programming language, such as Javam .NET, Go, C, C++, PHP, Perl, Python, etc. If the first information 150 and the second information 152 are of the same type or are in the same format, it may be easier to compare the first information 150 and the second information 152 in subsequent steps of the pipeline, which may reduce the amount of computational power consumed to make such comparisons. Alternatively, the first information 150 and the second information 152 may be of different types or may be in different formats.

The pipeline software 106 can next determine a first set of characteristics associated with the first software 128 based on the first information 150. The first set of characteristics can include one or more characteristics. For example, the pipeline software 106 can extract the first set of characteristics from the first information 150 using one or more parsers, such as parser 142. A parser is software that breaks data into smaller elements for easy interpretation or analysis. Parsers can analyze input in the form of a sequence of tokens (e.g., words) or program instructions to build a corresponding data structure, such as a parse tree or abstract syntax tree. Some parsers can use natural language processing, programming language processing, or both to identify functions, syntaxes, commands, arguments, and operators. The pipeline software 106 can execute the one or more parsers to extract the relevant characteristics from the first information 150. In some examples, the pipeline software 106 may select a parser for use in parsing the first information 150 based on a type of the first software 128, a format or programming language of the first information 150, or both of these. The computing device 104 may then obtain the parser from a parser repository 140, for example by downloading the one or more parsers from the parser repository 140 via a network 154 such as a local area network or the Internet. The parsers in the parser repository 140 may be independent, downloadable modules configured to be integrated with the pipeline software 106 for use in parsing information.

The pipeline software 106 can also determine a second set of characteristics associated with the second software 130 based on the second information 152. The second set of characteristics can include one or more characteristics. For example, the pipeline software 106 can extract the second set of characteristics from the second information 152 using one or more parsers, such as parser 142. In some examples, the pipeline software 106 may select a parser for use in parsing the second information 152 based on a type of the second software 130, a format or programming language of the second information 152, or both of these. The parsers used to parse the second information 152 may be the same as, or different from, the parsers used to parse the first information 150. For example, if the first information 150 is in a different format than the second information 152, then the parser used to parse the first information 150 may be different from the parser used to parse the second information 152.

The first set of characteristics associated with the first software 128 and the second set of characteristics associated with the second software 130 can include any suitable characteristics, respectively. For example, the first set of characteristics can include one or more binary files forming part of a software package for the first software 128, and the second set of characteristics can include one or more binary files forming part of a software package for the second software 130. As another example, the first set of characteristics can include one or more variables or functions in the source code for the first software 128, and the second set of characteristics can include one or more variables or functions in the source code for the second software 130. As yet another example, the first set of characteristics can include one or more commands in an application programming interface (API) specification for the first software 128, and the second set of characteristics can include one or more commands in an API specification for the second software 130. While in these examples the first set of characteristics and the second set of characteristics are of the same type, it will be appreciated that in other examples the first set of characteristics and the second set of characteristics can be of different types (e.g., so long as they are still indicative of similar information).

Next, the pipeline software 106 can compare the first set of characteristics to the second set of characteristics to determine one or more differences between the two. For example, the first set of characteristics can include a first set of binary files forming part of a software package for the first software 128, and the second set of characteristics can include a second set of binary files forming part of a software package for the second software 130. So, the pipeline software 106 can compare the first set of binary files to the second set of binary files to determine any differences between the two. As another example, the first set of characteristics can include a first set of functions in the source code for the first software 128, and the second set of characteristics can include a second set of functions in the source code for the second software 130. So, the pipeline software 106 can compare the first set of functions to the second set of functions to determine any differences between the two. As yet another example, the first set of characteristics can include a first set of global variables in the source code for the first software 128, and the second set of characteristics can include a second set of global variables in the source code for the second software 130. So, the pipeline software 106 can compare the first set of global variables to the second set of global variables to determine any differences between the two. As still another example, the first set of characteristics can include a first set of commands in an application programming interface (API) specification for the first software 128, and the second set of characteristics can include a second set of commands in an API specification for the second software 130. So, the pipeline software 106 can compare the first set of commands to the second set of commands to determine any differences between the two.

Having determined the one or more differences, the pipeline software 106 can automatically generate one or more rules 108 based on the one or more differences. A rule can be usable by a migration engine 124 to detect a difference between the first software 128 and the second software 130 and generate a corresponding output. In some examples, a rule can include a conditional statement (e.g., IF-THEN statements) such that if a certain condition exists, a particular output is generated. For example, a rule can include a conditional statement for determining if a difference in binary packages exists and, if so, outputting a notification indicating the difference in binary packages. As another example, the rule can include a conditional statement for determining if a difference in commands between two API specifications exists and, if so, generating an output notification indicating the difference in commands.

In some examples, the pipeline software 106 can automatically generate the one or more rules 108 by using rule templates. A rule template can be a predefined template with one or more variables or fields configured to be modified to produce a rule. In one example, the pipeline software 106 can select a rule template 120 from among a group of rule templates in a rule template repository 118. The rule templates in the rules repository 126 can correspond to various types of differences to be detected by the migration engine 124. The pipeline software 106 can select the rule template 120 based on a difference to be detected by the resulting rule. The pipeline software 106 can then obtain the selected rule template 120, for example by downloading the rule template from the rule template repository 118 via the network 154. The pipeline software 106 can modify the selected rule template 120, for example based on one or more parameters associated with the first software 128 and the second software 130, to customize the rule template 120 accordingly and thereby generate the one or more rules 108.

After generating the one or more rules 108, the pipeline software 106 can provide the rules 108 for use by the migration engine 124. For example, pipeline software 106 can store the rules 108 in a data structure 146, such as a file or data object. The data structure 146 may have a format that is compatible with the migration engine 124. For example, the data structure 146 can specify the rules 108 in a format configured to be ingested and read by the migration engine 124.

In some examples, the pipeline software 106 can determine one or more severity levels to assign to the rules 108. For example, the pipeline software 106 can determine that a rule 108 is configured to detect a condition that is of high severity (e.g., priority), medium severity, or low severity in relation to a migration process. A high-severity condition may impact a migration process more than a medium-severity condition, and a medium-severity condition may impact a migration process more than a low-severity condition. An example of a high-severity condition may be a condition that must be resolved for a migration to succeed, an example of a medium-severity condition may be a condition that can optionally be resolved to improve how the second software 130 operates after the migration, and an example of a low-severity condition may be a condition that does not fall into the other two categories. Of course, this is merely exemplary and there may be any number and arrangement of severity levels. In some examples, the pipeline software 106 can determine a severity level to assign to a rule 108 based on any factor or combination of factors. For example, the pipeline software 106 can determine a severity level to assign to a rule 108 based on a type of the first software 128, a type of the second software 130, the determined difference between the first set of characteristics and the second set of characteristics, one or more properties of the rule 108, or any combination of these. After determining a severity level associated with a rule 108, the pipeline software 106 can assign a corresponding severity identifier to the rule 108. The severity identifier can include one or more letters, numbers, or combination thereof indicating the severity level. The pipeline software 106 can assign the severity identifier to the rule by, for example, incorporating the severity identifier into the rule 108, incorporating the severity identifier into a data structure 146 that contains the rule 108, or incorporating the severity identifier in metadata associated with the rule 108.

In some examples, the rules 108 can be transmitted (e.g., directly or indirectly) to a rules repository 126 for subsequent use by a migration engine 124. For example, the computing device 104 can upload the rules 108 over the network 154 to the rule repository 126, which may be accessible to one or more client devices such as client device 122 that have migration engines usable to perform migration processes. A client device 122 can obtain the rules 108 from the rule repository 126 and integrate them with a migration engine 124. After integrating the rules 108 with the migration engine 124, for example by importing the rules 108 into the migration engine 124, the client device 122 can execute the migration engine 124 to analyze or effectuate a migration process for migrating the first software 128 to the second software 130 in a computing environment 144. One example of the computing environment 144 may be a cloud computing environment or another type of distributed computing environment, which may or may not include the client device 122. Alternatively, the client device 122 can include the computing environment 144.

It will be appreciated that the migration engine 124 can analyze the migration process before or after it has begun. For example, the migration engine 124 can preemptively analyze a desired migration process specified by the user 138, so that the migration engine 124 can notify the user 138 of any potential problems associated therewith. Either way, the migration engine 124 can analyze the migration process based on the rules 108 and generate one or more notifications 136 for a user 138 based on this analysis. For example, the client device 122 can use a rule 108 to determine if a difference exists in the computing environment 144 between a first set of binary packages associated with the first software 128 and a second set of binary packages associated with the second software 130. If so, the client device 122 can output a notification 136 to the user 138 warning the user 138 about this difference. For example, the notification 136 can indicate that the difference exists and may cause a potential migration failure. This can reduce or prevent various issues from arising in relation to problematic migration scenarios. Additionally, in some examples in which there are severity levels assigned to the rules 108, the migration engine 124 can determine the corresponding severity level and include severity information indicating the corresponding severity level in the notification 136. This can flag the difference as being of a particular severity level for the user 138, which may help the user 138 prioritize or resolve issues.

In some cases it may be desirable to test the rules 108, for example prior to the rules 108 being provided for use by the migration engine 124. This may help ensure that the rules 108 provide operate properly and yield the proper results. To that end, the pipeline software 106 can automatically generate test code 110 for testing the rules 108. In some examples, this automation may be selectively included in or excluded from the automated pipeline for generating the rules 108, depending on the needs of the user 134.

The pipeline software 106 can automatically generate the test code 110 based on the rules 108. The test code 110 can include program code that is executable by a testing engine 112 to test a target rule, such as some or all of the rules 108. The program code can be in any suitable programming language, such as C, C++, PHP, Java, JavaScript, Python, or Perl. The testing engine 112 is software configured to execute the test code 110 to verify that a target rule produces a desired result under one or more test conditions.

In some examples, the pipeline software 106 can automatically generate the test code 110 by using test-code templates. A test-code can be a predefined template with one or more variables or fields configured to be modified to produce test code. In one example, the pipeline software 106 can select a test-code template 116 from among a group of test-code templates in a code template repository 114. The test-code templates in the code template repository 114 can correspond to various types of rules to be tested by the testing engine 112. The pipeline software 106 can select the test-code template 116 based on a rule to be tested. The pipeline software 106 can then obtain the selected test-code template 116, for example by downloading the test-code template from the code template repository 114 via the network 154. The pipeline software 106 can modify the selected test-code template 116, for example based on one or more parameters associated with the target rule, to customize the test-code template 116 accordingly and thereby generate the test code 110.

After generating the test code 110, the computing device 104 (e.g., the pipeline software 106 thereon) can provide the test code 110 to the testing engine 112 to test one or more target rules. The testing engine 112 can execute the test code 110 to test the target rules and output a notification 132 to a user 134 indicating the results of the test(s). For example, the testing engine 112 can output a notification 132 indicating that the target rule passed or failed the tests. If the target rule failed the tests, the user 134 may correct any problems with the rule or remove the rule. This may improve the quality of the rules ultimately relied upon by the migration engines.

Although FIG. 1 shows a certain number and arrangement of components, this is for illustrative purposes and intended to be non-limiting. Other examples may include more components, fewer components, different components, or a different arrangement of the components shown in FIG. 1. For example, the computing device 104 can include some or all of the repositories shown in FIG. 1. Additionally or alternatively, the client device 122 can include the computing environment 144. And although one of each component is depicted in FIG. 1 for simplicity, each of these components can represent multiple of such components. For example, source 148 can include multiple sources of information, rules repository 126 can include multiple rule repositories, parser repository 140 can include multiple parser repositories, etc.

Figure 2:
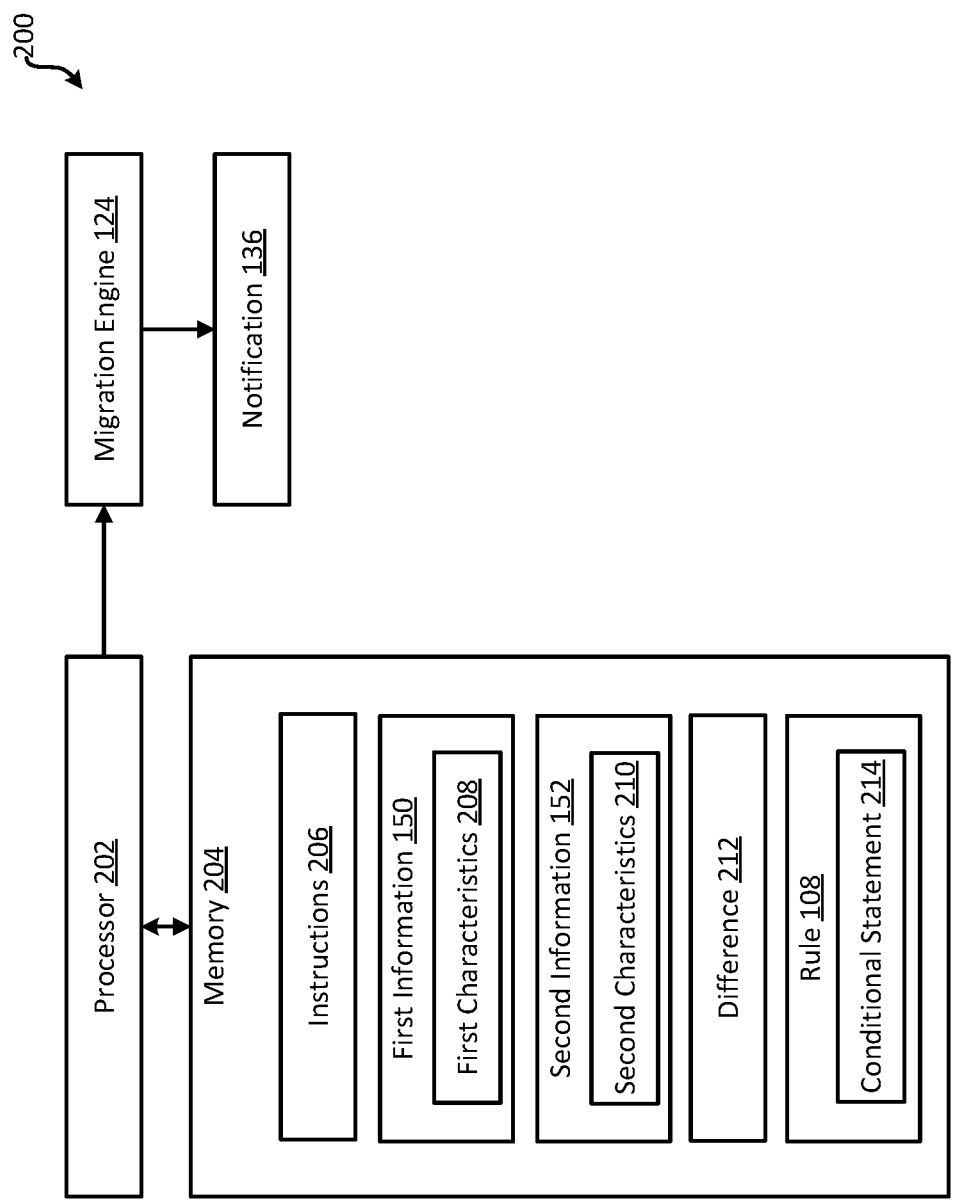
FIG. 2 is a block diagram of another example of a system for generating migration rules for a migration engine according to some aspects of the present disclosure.

FIG. 2 is a block diagram of another example of a system 200 according to some aspects of the present disclosure. The system 200 includes a processor 202 communicatively coupled to a memory 204. In some examples, the processor 202 and the memory 204 can be part of the same computing device, such as the computing device 104 of FIG. 1. In other examples, the processor 202 and the memory 204 can be distributed from (e.g., remote to) one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc. In some examples, the instructions 206 can include the pipeline software 106 of FIG. 1.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute the instructions 206 to perform operations. For example, the processor 202 can receive first information 150 indicating first characteristics 208 of first software and can receive second information 152 indicating second characteristics 210 of second software. The processor 202 can determine a difference 212 between the first characteristics 208 and the second characteristics 210. The processor 202 can then generate a rule 108 for a migration engine 124 based on the difference 212. For example, the processor 202 can generate a rule 108 that is to be supplied to and used by a migration engine 124. The rule 108 can include a conditional statement 214 configured for use by the migration engine 124 to detect the difference 212 in relation to a migration process for migrating the first software to the second software. The processor 202 can provide the rule 108 for use by the migration engine 124. Providing the rule 108 for use by the migration engine 124 can enable the migration engine 124 to detect the difference 212 and responsively generate a notification 136 associated with the difference. The notification 136 may be output to a user associated with the migration process, so that the user can take appropriate action to mitigate problems associated with the difference. Examples of such actions can include stopping or foregoing the migration process, or resolving the difference 212 before continuing with the migration process.

Figure 3:
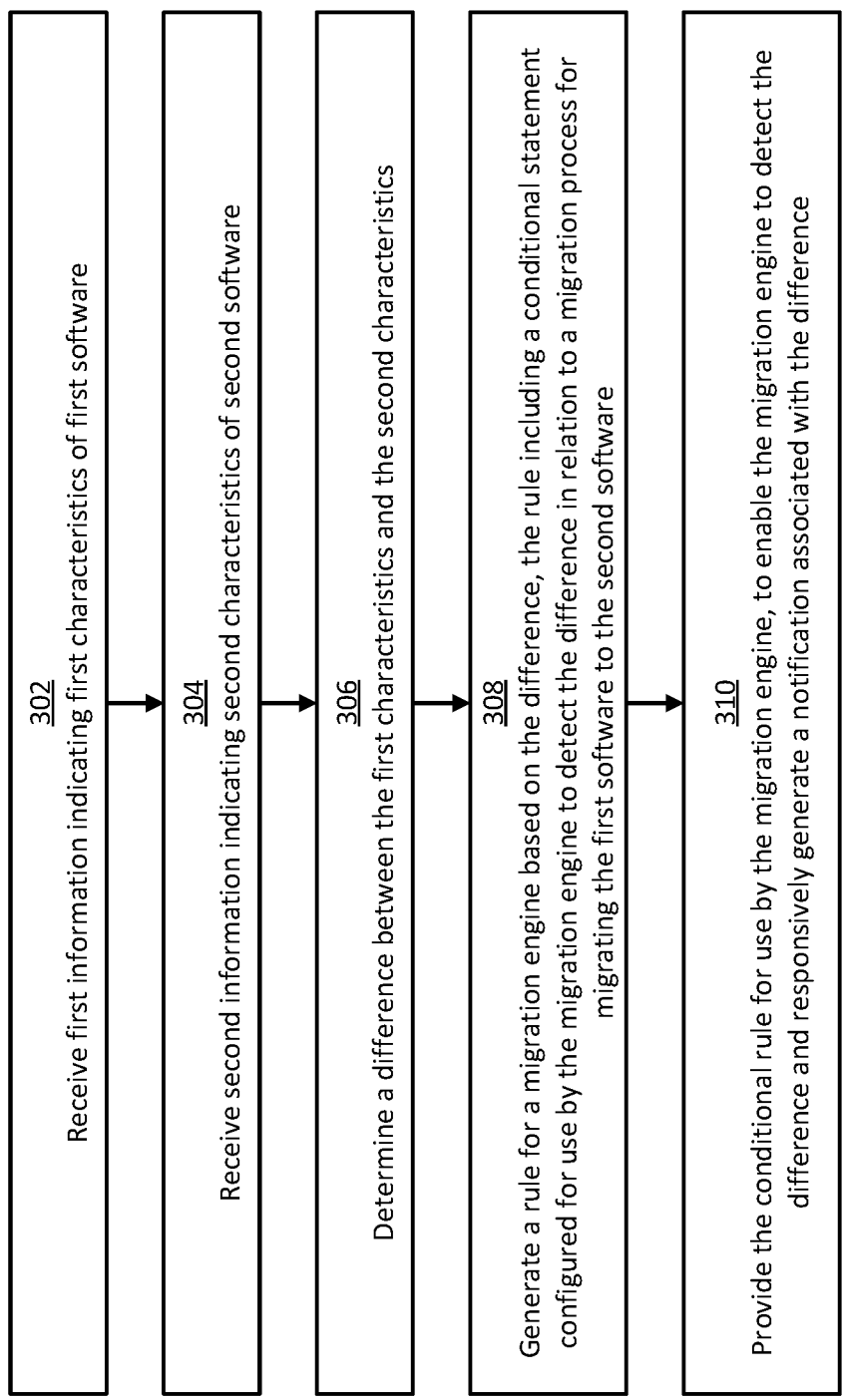
FIG. 3 is a flow chart of an example of a process for generating migration rules for a migration engine according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processor 202 receives first information 150 indicating first characteristics 208 of first software. The processor 202 can receive the first information 150 from any suitable source, such as a code repository, a project package, or a website associated with the first software.

In block 304, the processor 202 receives second information 152 indicating second characteristics 210 of second software. The processor 202 can receive the second information 152 from any suitable source, such as a code repository, a project package, or a website associated with the first software.

In block 306, the processor 202 determines a difference 212 between the first characteristics 208 and the second characteristics 210. For example, the processor 202 can compare the first characteristics 208 to the second characteristics 210 to determine one or more differences 212 between the two.

In block 308, the processor 202 generates a rule 108 for a migration engine 124 based on the difference 212. The rule 108 may include a conditional statement 214 configured for use by the migration engine 124 to detect the difference 212 in relation to a migration process for migrating the first software to the second software. In some examples, the processor 202 can use one or more rule templates to generate the rule 108. The processor 202 may select or modify a rule template based on the difference 212 determined in block 308.

In block 310, the processor 202 provides the rule 108 for use by the migration engine 124. This may involve storing the rule 108 in a data structure that is compatible with the migration engine 124, transmitting the rule 108 to a rule repository, transmitting the rule 108 to a computing device that contains the migration engine 124, etc. Providing the rule 108 for use by the migration engine 124 can enable the migration engine 124 to detect the difference 212 and responsively generate a notification 136 associated with the difference.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
  a processor; and
  a memory including instructions that are executable by the processor for causing the processor to:
    receive first information indicating first characteristics of first software;
    receive second information indicating second characteristics of second software;
    determine a difference between the first characteristics and the second characteristics by comparing the first characteristics to the second characteristics;
    generate a rule for a migration engine based on the difference, the rule including a conditional statement configured for use by the migration engine to detect the difference in relation to a migration process for migrating the first software to the second software; and
    provide the rule for use by the migration engine, to enable the migration engine to detect the difference and responsively generate a notification associated with the difference.

2. The system of claim 1, wherein the first information describes the first characteristics in a particular format and the second information describes the second characteristics in the particular format, and wherein the memory further includes instructions that are executable by the processor for causing the processor to:
  extract the first characteristics from the first information using one or more parsers configured for parsing data in the particular format; and
  extract the second characteristics from the second information using the one or more parsers.

3. The system of claim 1, wherein the memory further includes instructions that are executable by the processor for causing the processor to:
  generate, based on the rule, test code that is executable by a testing engine for testing the rule; and
  store the test code in a memory device.

4. The system of claim 3, wherein the memory further includes instructions that are executable by the processor for causing the processor to generate the test code by adjusting one or more variable values in a code template.

5. The system of claim 1, wherein the memory further includes instructions that are executable by the processor for causing the processor to generate the rule by adjusting one or more variable values in a rule template.

6. The system of claim 5, wherein the memory further includes instructions that are executable by the processor for causing the processor to select the rule template from among a plurality of rule templates based on the difference.

7. The system of claim 1, wherein the migration engine is configured to flag the difference as being of a particular severity level among a plurality of severity levels, in response to detecting the difference in relation to the migration process.

8. The system of claim 1, wherein the memory further includes instructions that are executable by the processor for causing the processor to provide the rule for use by the migration engine by storing the rule in a data structure configured to be read by the migration engine.

9. A method comprising:
  receiving, by a processor, first information indicating first characteristics of first software;
  receiving, by the processor, second information indicating second characteristics of second software;
  determining, by the processor, a difference between the first characteristics and the second characteristics by comparing the first characteristics to the second characteristics;
  generating, by the processor, a rule for a migration engine based on the difference, the rule including a conditional statement configured for use by the migration engine to detect the difference in relation to a migration process for migrating the first software to the second software; and
  providing, by the processor, the rule for use by the migration engine, to enable the migration engine to detect the difference and responsively generate a notification associated with the difference.

10. The method of claim 9, wherein the first information describes the first characteristics in a particular format and the second information describes the second characteristics in the particular format, and further comprising:
  extracting, by the processor, the first characteristics from the first information using one or more parsers configured for parsing data in the particular format; and
  extracting, by the processor, the second characteristics from the second information using the one or more parsers.

11. The method of claim 9, further comprising:
generating, by the processor and based on the rule, test code that is executable by a testing engine for testing the rule; and
storing, by the processor, the test code in a memory device.

12. The method of claim 11, further comprising generating the test code by adjusting one or more variable values in a code template.

13. The method of claim 12, further comprising generating the rule by adjusting one or more variable values in a rule template.

14. The method of claim 13, further comprising:
selecting, by the processor, the rule template from among a plurality of rule templates based on the difference.

15. The method of claim 9, wherein the migration engine is configured to flag the difference as being of a particular severity level among a plurality of severity levels, in response to detecting the difference in relation to the migration process.

16. The method of claim 9, further comprising providing the rule for use by the migration engine by storing the rule in a data structure configured to be read by the migration engine.

17. A non-transitory computer-readable medium comprising program code that is executable by a processor for causing the processor to:
receive first information describing first characteristics of first software;
receive second information describing second characteristics of second software;
determine a difference between the first characteristics and the second characteristics by comparing the first characteristics to the second characteristics;
generate a rule for a migration engine based on the difference, the rule including a conditional statement configured for use by the migration engine to detect the difference in relation to a migration process for migrating the first software to the second software; and
provide the rule for use by the migration engine, to enable the migration engine to detect the difference and responsively generate a notification associated with the difference.

18. The non-transitory computer-readable medium of claim 17, further comprising program code that is executable by the processor for causing the processor to generate the rule by adjusting one or more variable values in a rule template.

* * * * *